United States Patent
Mestha et al.

(10) Patent No.: US 11,144,683 B2
(45) Date of Patent: Oct. 12, 2021

(54) REAL-TIME ADAPTATION OF SYSTEM HIGH FIDELITY MODEL IN FEATURE SPACE

(71) Applicant: General Electric Company, Schenectady, NY (US)

(72) Inventors: Lalit Keshav Mestha, North Colonie, NY (US); Masoud Abbaszadeh, Clifton Park, NY (US); Cody Bushey, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 736 days.

(21) Appl. No.: 15/491,243

(22) Filed: Apr. 19, 2017

(65) Prior Publication Data

US 2018/0157771 A1    Jun. 7, 2018

Related U.S. Application Data

(60) Provisional application No. 62/430,737, filed on Dec. 6, 2016.

(51) Int. Cl.
*G06F 30/20* (2020.01)
*G06F 30/17* (2020.01)
*G06F 111/10* (2020.01)

(52) U.S. Cl.
CPC .............. *G06F 30/20* (2020.01); *G06F 30/17* (2020.01); *G06F 2111/10* (2020.01)

(58) Field of Classification Search
CPC ............. G06F 17/5009; G06F 17/5086; G06F 2217/16
See application file for complete search history.

(56) References Cited

U.S. PATENT DOCUMENTS 6,625,569 B2    9/2003  James et al.
7,630,326 B1 *  12/2009 Shear ................. H04L 41/0813
                                                                370/254

(Continued)

FOREIGN PATENT DOCUMENTS

CN     103929281 A    7/2014
CN     102799512 B    6/2015

OTHER PUBLICATIONS

Primiceri, Giorgio E., "Time varying structural vector Autoregressions and monetary policy" SSRN Electronic Journal, vol. 72, No. 3, 2005, (pp. 821-852, 32 total pages).

(Continued)

*Primary Examiner* — Saif A Alhija
(74) *Attorney, Agent, or Firm* — Buckley, Maschoff & Talwalkar LLC

(57) ABSTRACT

An augmented system model may include a system high fidelity model that generates a first output. The augmented system model may further include a data driven model to receive data associated with the first output and to generate a second output, and a feature space version of the second output may be output from the augmented system model. Monitoring nodes may each generate a series of current monitoring node values over time representing current operation of an industrial asset. A model adaptation element may receive the current monitoring node values, calculate a feature space version of current operation, and compare the feature space version of the second output of the augmented system model with the feature space version of current operation. Parameters of the data driven model may then be adapted based on a result of the comparison.

20 Claims, 11 Drawing Sheets

(56) References Cited

U.S. PATENT DOCUMENTS

| | | | |
|---|---|---|---|
| 8,402,543 | B1 | 3/2013 | Ranjan et al. |
| 2005/0209959 | A1* | 9/2005 | Tenney .................. G06Q 40/10 705/39 |
| 2008/0154823 | A1 | 6/2008 | Volponi et al. |
| 2011/0028827 | A1 | 2/2011 | Sitaram et al. |
| 2012/0022869 | A1 | 1/2012 | Lloyd et al. |
| 2013/0263651 | A1* | 10/2013 | Bassily .............. G05B 23/0248 73/112.01 |
| 2013/0323698 | A1 | 12/2013 | Gifford et al. |
| 2017/0053445 | A1* | 2/2017 | Chen .................... H04N 13/344 |

OTHER PUBLICATIONS

Mestha, Lalit K. et al., "Control of Digital Imaging Systems: Analysis and Design" Boca Raton, FL: Taylor & Francis, 2009, (pp. cover 2 + pp. 344-350, 9 total pages).

Nakajima, Jouchi, "Time-Varying Parameter VAR Model with Stochastic Volatility: An Overview of Methodology and Empirical Applications", Monetary and Economic Studies, Nov. 2011, (pp. 107-142, 36 total pages).

Hill, D., et al., "A Vector Auto-Regressive Model for Onshore and Offshore Wind Synthesis Incorporating Meteorological Model Information", Advances in Science & Research, vol. 11, May 14, 2014, DOI:10.5194/asr-11-35-2014, (pp. 35-39, 5 total pages).

He, Miao et al., "A Sparsified Vector Autoregressive Model for Short-Term Wind Farm Power Forecasting", IEEE Sower & Energy Society General Meeting, Jul. 26-30, 2015, 5pgs.

Stock, James H. et al., "Factor Models and Structural Vector Auto Regressions in Macroeconomics", Handbook of Macroeconomics, Mar. 9, 2016, (pp. 1-111, 111 total pages).

* cited by examiner

REAL-TIME ADAPTATION OF SYSTEM HIGH FIDELITY MODEL IN FEATURE SPACE

CROSS-REFERENCE TO RELATED APPLICATIONS

The present application claims the benefit of U.S. Provisional Patent Application No. 62/430,737 entitled "METHODS FOR REAL-TIME ADAPTATION OF SYSTEM MODELS IN FEATURE SPACE USING VECTOR AUTO REGRESSION" and filed on Dec. 6, 2016. The entire contents of that application are incorporated herein by reference.

BACKGROUND

Machines, such as industrial assets, are constantly undergoing physical changes. In a gas turbine, for example, a filter can build up particulate which can alter performance of the turbine. Similarly, a compressor can become dirty from extended operation without being cleaned which can degrade performance, parts can physically change due to stress, erosion, and/or corrosion which can impact operation of the asset, etc. Moreover, the environment around an industrial asset can sometimes undergo changes. For example, one gas turbine might operate inside a climate controlled facility while another turbine operates in the middle of a desert (or even in arctic conditions). It can be difficult to create a digital model to simulate such industrial assets that will remain accurate as the machines and/or environments change over time (e.g., to allow for accurate analysis of the asset, to facilitate cyber security, to provide inputs to an optimization or economic algorithm, etc.).

One approach to keeping a model accurate would be to manually adapt the asset model parameters. Given the complexity of such models, however, this can be a time consuming, costly, and error-prone process, especially when a model is associated with a substantial number of monitoring nodes (e.g., an industrial asset might be associated with hundreds of monitoring nodes). It would therefore be desirable to tune model parameters of an industrial asset in an automatic and accurate manner.

SUMMARY

According to some embodiments, a system to model an industrial asset may receive data from an industrial asset control system and may include an augmented system model with a system high fidelity model of the industrial asset to generate a first output. The first output may be in feature space. The augmented system model may further include a data driven model to receive data associated with the first output and to generate a second output, wherein a feature space version of the second output is output from the augmented system model. A plurality of monitoring nodes may each generate a series of current monitoring node values over time that represent a current operation of the industrial asset. A model adaptation element may receive the series of current monitoring node values over time and calculate a feature space version of current operation of the industrial asset. The model adaptation element may then compare the feature space version of the second output of the augmented system model with the feature space version of current operation of the industrial asset. Parameters of the data driven model may then be adapted based on a result of the comparison.

Some embodiments comprise: means for outputting, by an augmented system model that includes a system high fidelity model of the industrial asset in series with a data driven model, a feature space version of augmented system model output; means for receiving, at a model adaptation element from a plurality of monitoring nodes, a series of current monitoring node values over time that represent a current operation of the industrial asset; means for calculating a feature space version of current operation of the industrial asset; means for comparing, by the model adaptation element, the feature space version of augmented system model output with the feature space version of current operation of the industrial asset; and means for adapting parameters of the linear data driven model based on a result of said comparison.

Some technical advantages of some embodiments disclosed herein are improved systems and methods to model an industrial asset in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
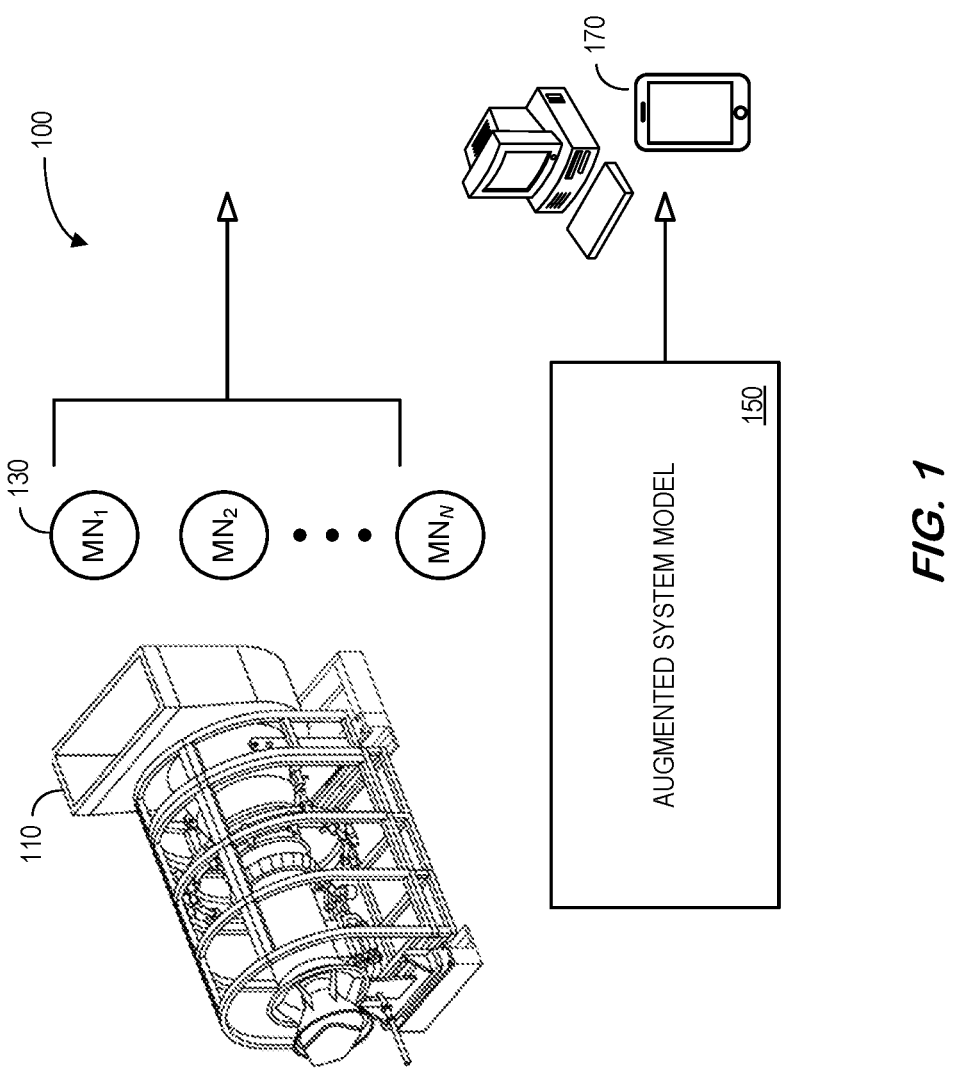
FIG. 1 is a high-level block diagram of a system that may be provided in accordance with some embodiments.

Creating a model of an industrial asset can be a difficult task because such systems will typically undergo physical and/or environmental changes over time. It would therefore be desirable to run model parameters of an industrial asset in an automatic and accurate manner. FIG. 1 is a high-level architecture of a system 100 in accordance with some embodiments. The system 100 may include an industrial asset 110 (e.g., a gas turbine) and a number of monitoring nodes 130. In the example of FIG. 1, the industrial asset 110 is associated with N monitoring nodes labeled $MN_1$, $MN_2$, ..., $MN_N$.

In addition, the system includes an augmented system model 150 that may operate in accordance with any of the embodiments described herein. The augmented system model 150 may, for example, generate an output to one or more remote operator devices 170 when appropriate (e.g., for display to a user or to be automatically inputted to another algorithm or process). As used herein, the term "automatically" may refer to, for example, actions that can be performed with little or no human intervention. According to some embodiments, information generated by the augmented system model 150 may be transmitted back to the industrial asset 110.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The augmented system model 150 may store information into and/or retrieve information from various data stores. The various data sources may be locally stored or reside remote from the augmented system model 150. Although a single augmented system model 150 is shown in FIG. 1, any number of such devices may be included. Moreover, various devices described herein might be combined according to embodiments of the present invention. For example, in some embodiments, the augmented system model 150 and one or more data stores might comprise a single apparatus. The augmented system model 150 functions may be performed by a constellation of networked apparatuses, in a distributed processing or cloud-based architecture.

A user may access the system 100 via one of the operator devices 170 (e.g., a Personal Computer ("PC"), tablet, smartphone, or remotely through a remote gateway connection) to view information about and/or manage industrial asset 110 information in accordance with any of the embodiments described herein. In some cases, an interactive graphical display interface may let a user view and/or adjust certain parameters and/or provide or receive automatically generated recommendations or results from the augmented system model 150.

Note that the augmented system model 150 may be associated with high fidelity models of industrial asset. One challenge with such models is how to keep them tuned to an actual machine when running in substantially real time. The augmented system model 150 in the various embodiments described herein may leverage mathematics to determine when a machine and an associated model are drifting apart in feature space—which may reduce noise. This information may then be fed back to a data driven model to tune knobs and keep the model output and the machine output substantially identical. As a result, accurate analytics may be built on top of this tuned model (e.g., analytics associated with cyber security, optimization or economic algorithms, etc.). Some embodiments may utilize a parameterized model on the output of an asset model to embed a layer of abstraction into the model output (such that the adaptation of these outputs is more readily achieved than adapting an entire asset model which is generally an intractable problem due to substantial non-linearity and large number of internal parameters).

Figure 2:
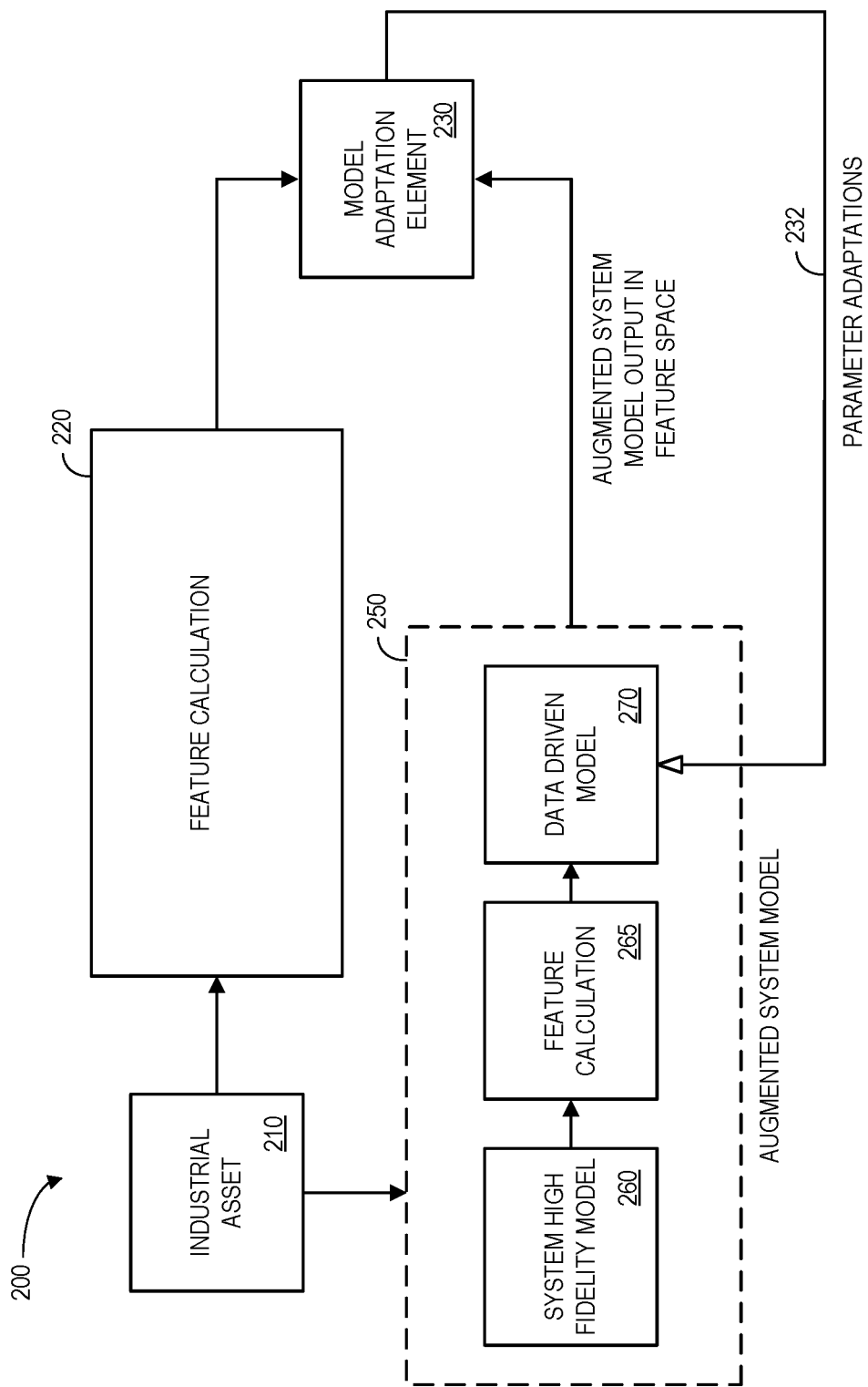
FIG. 2 is a more detailed block diagram of a system that may be provided in accordance with some embodiments in which feature calculation is located before the data driven model.

FIG. 2 is a more detailed block diagram of a system 200 that may be provided to model an industrial asset 210 in accordance with some embodiments in which a feature calculation is located before a data driven model. The system 200 includes an augmented system model 250 having a system high fidelity model 260 of the industrial asset 210 to generate a first output. A feature calculation is located after the system high fidelity model 260 so that the first output is in feature space. The feature calculation 265 converts time series information from the system high fidelity model 260 into feature space. The augmented system model 250 also includes a data driven model 270 (e.g., a linear or non-linear data driven model) to receive data associated with the first output and to generate a second output. Note that a feature space version of the second output is output from the augmented system model 250. In some cases, the feature transformation may be identity, resulting in the original signals being used as features.

The industrial asset 210 may be associated with a plurality of monitoring nodes each generating a series of current monitoring node values over time that represent a current operation of the industrial asset control system. According to some embodiments, the system 200 further includes a model adaptation element 230 that may receive data after a series of current monitoring node values over time and calculate a feature space version of current operation of the industrial asset 210. Note that this calculation of the feature space could instead be separately performed by one or more elements positioned between the industrial asset 210 and the model adaptation element 230 (as illustrated by feature calculation 220 in FIG. 2). The model adaption element 230 may compare the feature space version of the second output of the augmented system model 250 with the feature space version of current operation of the industrial asset 210. The model adaptation element 230 may then adapt parameters 232 of the data driven model 270 based on a result of said comparison. Note that in some embodiments, the augmented system model 250 may also receive information from the industrial asset 210 (e.g., the system high fidelity model 260 might receive information from the industrial asset 210).

Thus, a feature based digital model of the industrial asset 210 may be provided. It may be associated with a cascade of a nonlinear time invariant dynamic model (called "system model") and a time varying model. This may generalize the concept of Hammerstein and Wiener models which consist of cascading a nonlinear static model and a time invariant model. Note that the augmented system models 250 described herein might be associated with an open loop plant model or a closed loop plant-controller model.

System models define the physics of a system, and some embodiment will be described herein in connection with high fidelity models of gas turbines that are used for power generation. Note, however, that any of the embodiments for adaptation are applicable to any system models. A typical gas turbine model is stagnant (meaning it does not trend with real world machine operation, such as when the machine performance is degraded due to compressor fouling, component wear, or any other hindrance). Embodiments described herein may adapt the parameters of the data driven model in substantially real-time based on inputs from monitoring nodes (e.g., sensors) connected to the physical machinery such that the augmented system model 250 will represent an accurate digital model of the asset under consideration.

Figure 3:
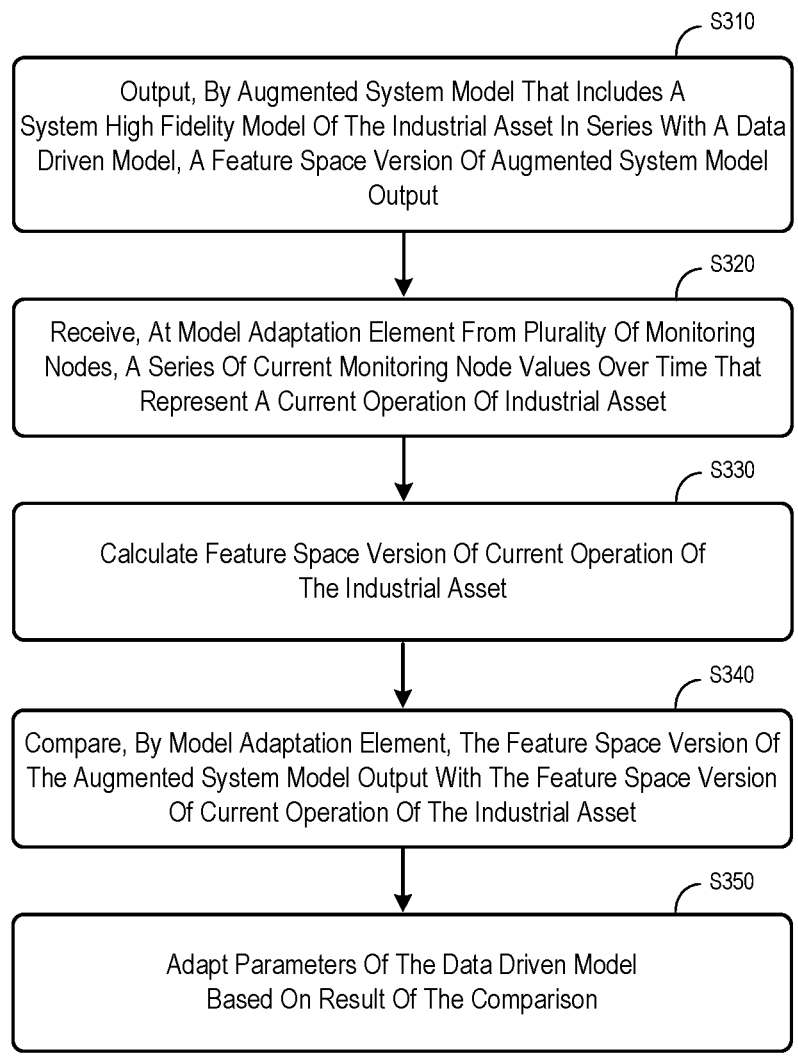
FIG. 3 is a method according to some embodiments.

For example, FIG. 3 illustrates a method that might be performed by some or all of the elements of the systems 100, 200 described with respect to FIGS. 1 and 2 (as well as any other embodiment described herein). The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, an augmented system model (including a system high fidelity model of an industrial asset in series with a feature computation module and a data driven model) may output a feature space version of augmented system model output. According to some embodiments, a first output of the system high fidelity model (e.g., a non-linear system high fidelity model) is provided directly to the data driven model, and a second output of the linear data driven model is used to calculate the feature space version of the second output. In other embodiments, the first output is used to calculate a feature space version of the first output which is then provided to the data driven model as an input such that the second output generated by the data driven model is already in feature space. Note that the data driven model might be associated with linear or non-linear models.

At S320, a model adaptation element may receive, from a plurality of monitoring nodes, a series of current monitoring node values over time that represent a current operation of the industrial asset. At S330, the model adaptation element (or any other element) may calculate a feature space version of current operation of the industrial asset. At S340, the model adaptation element may compare the feature space version of augmented system model output with the feature space version of current operation of the industrial asset control system. At S350, the model adaptation element may adapt parameters of the data driven model based on a result of the comparison performed at S340.

According to some embodiments, the feature set calculation associated with the augmented system model comprises calculating local features and using the calculated local features to calculate global features. Similarly, the calculation of the feature space version of current operation of an industrial asset comprises calculating local features and using the calculated local features to calculate global features of current operation of the industrial asset. Note that any of the feature calculations described herein may utilize feature discovery approaches well known to the machine learning community to create features. By ways of example only, feature calculations might be associated with unsupervised learning, k-means clustering, manifold learning, non-linear embedding, an isomap method, Locally-Linear Embedding ("LLE"), low-dimension projection, Principal Component Analysis ("PCA"), Independent Component Analysis ("ICA"), neural networks, a Self-Organizing Map ("SOM") method, genetic programing, sparse coding, linear discriminant analysis, wavelet transform, Fourier transform, and/or identify transform.

According to some embodiments, the data driven model is a Vector Auto-Regressive ("VAR") model. As will be described, the comparing and adapting performed at S340, S350 might use: a time varying parameter VAR model; an event based re-training of the VAR model; and/or batch-by-batch updates of the VAR model on a continuous basis.

Figure 4:
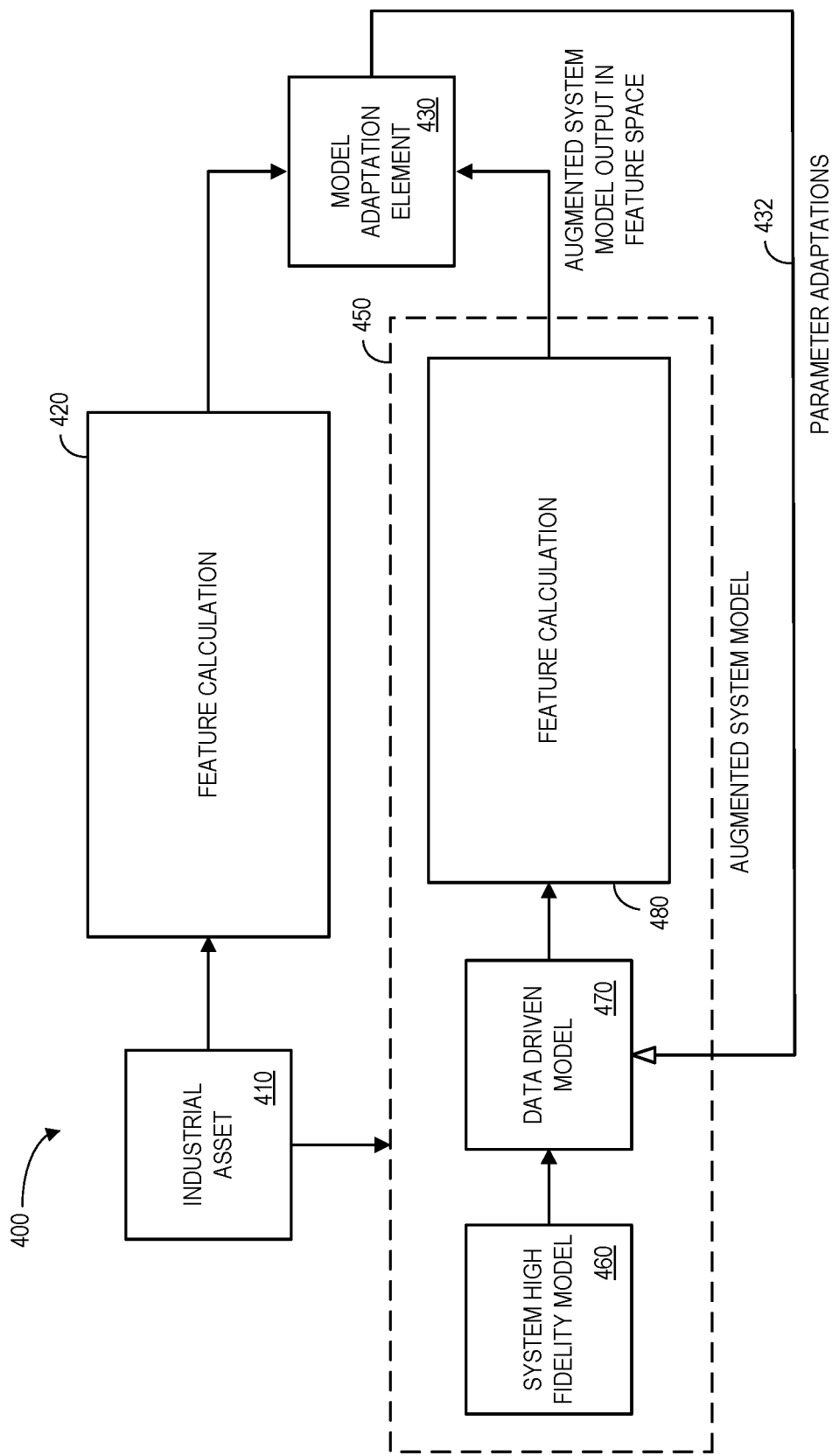
FIG. 4 is a block diagram of a system with a feature calculation located after a data driven model in accordance with some embodiments.

FIG. 4 is a block diagram of a system 400 with a feature calculation located after a data driven model in accordance with some embodiments. The system 400 includes an industrial asset 410 and a feature calculation 420 that converts time series information about the current operation of the industrial asset 410 into feature space. The feature space version of current operation is provided from the feature calculation 420 to a model adaptation element 430.

The system 400 also includes an augmented system model 450 in which data output from a system high fidelity model 460 is provided directly to a data driven model 470 (e.g., a VAR model). The output of the data driven model 470 is then converted into feature space by a feature calculation 480 before being provided to the model adaptation element 430.

The model adaptation element 430 may then compare current operation in the feature space with the augmented system model 450 output (also in feature space) and provide parameter adaptations 432 to the data driven model 470. Thus, the system 400 may provide real-time adaptation of a system model output. Note that a data driven model might refer to any linear or non-linear model, including, for example: a Neural Network ("NN"), a Fuzzy Rule-Based System ("FRBS"), a Genetic Algorithms ("GA"), a clustered VAR model, a Single Input, Single Output ("SISO") transfer function, a Multiple Input, Multiple Output ("MIMO") model transfer function, etc. Note that the parameters in the VAR model 470 might be adapted to correct for error on a continuous basis or on an event-driven basis (e.g., when the error is larger than a certain predetermined threshold). Note that in some embodiments, the augmented system model 450 may also receive information from the industrial asset 410 (e.g., the system high fidelity model 460 might receive information from the industrial asset 410).

Figure 5:
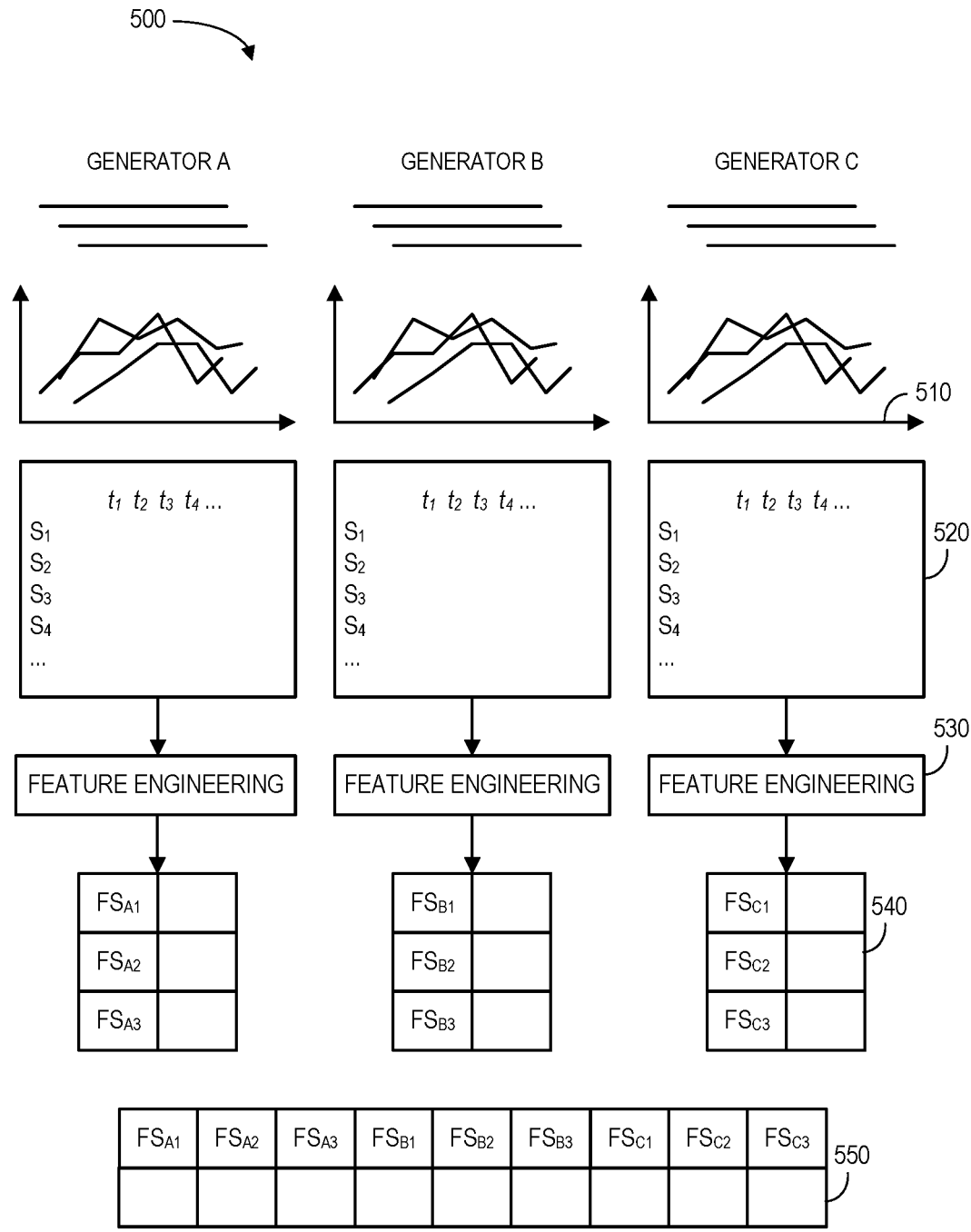
FIG. 5 is an example of a global feature calculation system in accordance with some embodiments.

According to some embodiments, local and/or global features may be utilized. For example, FIG. 5 is an example of a global feature calculation system 500 in accordance with some embodiments. In particular, the system 500 includes three generators (A, B, and C) and batches of values 510 from monitoring nodes are collected for each generated over a period of time (e.g., 30 to 50 seconds). According to some embodiments, the batches of values 510 from monitoring nodes overlap in time. The values 510 from monitoring nodes may, for example, be stored in a matrix 520 arranged by time ($t_1$, $t_2$, etc.) and by type of monitoring node ($S_1$, $S_2$, etc.). Feature engineering components 530 may use information in each matrix 520 to create a feature vector 540 for each of the three generators (e.g., the feature vector 540 for generator C might include $FS_{C1}$, $FS_{C2}$, etc.). The three feature vectors 540 may then be combined into a single global feature vector 550 for the system 500.

Figure 6:
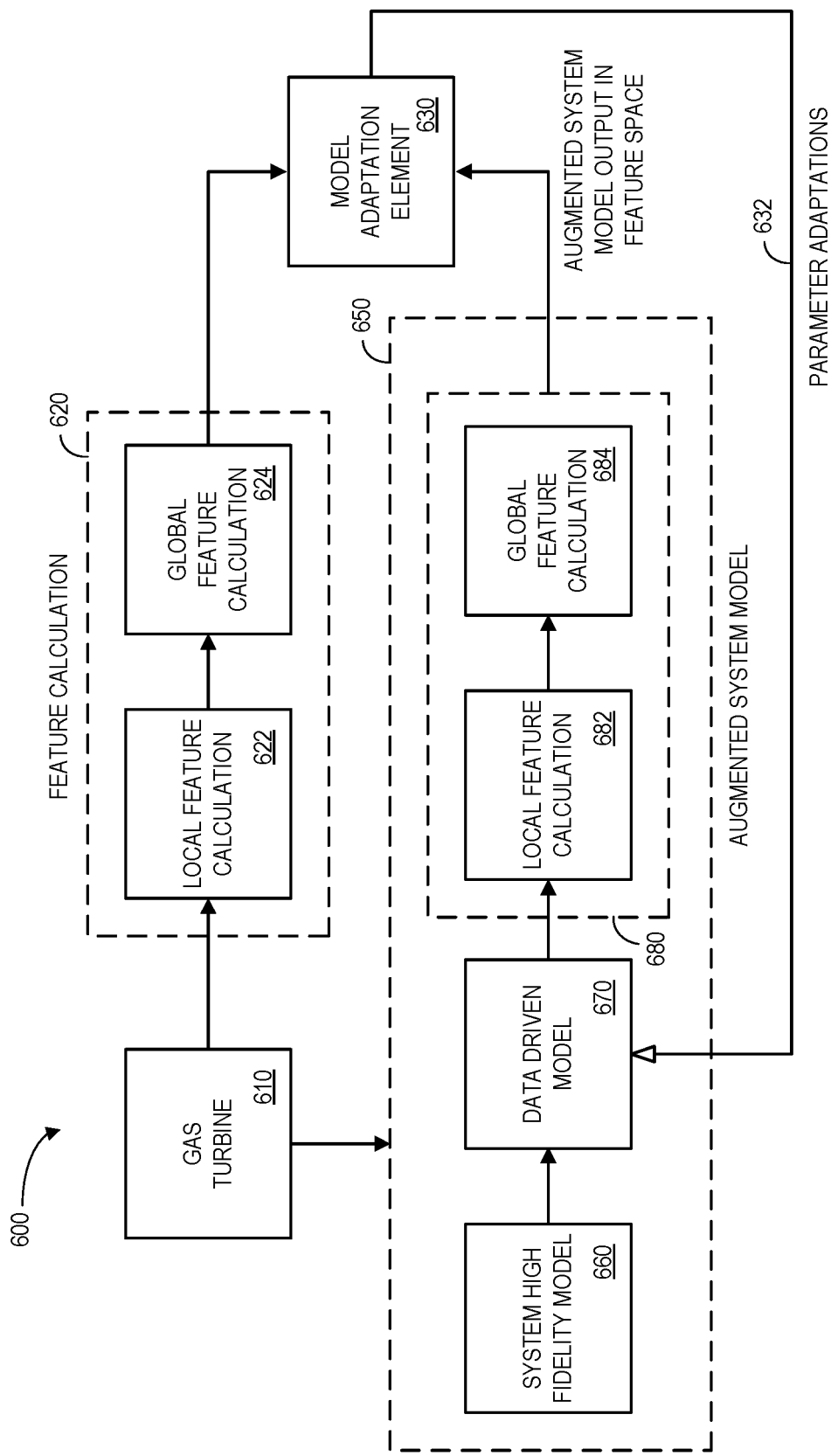
FIG. 6 is a block diagram of a gas turbine system with local and global feature calculations located after a data driven model in accordance with some embodiments.

FIG. 6 is a block diagram of a gas turbine system with local and global feature calculations located after a data driven model (e.g., a VAR model) in accordance with some embodiments. The system 600 includes a gas turbine 610 and a feature calculation 620 that converts time series information about the current operation of the gas turbine 610 into feature space. In particular, the feature calculation 620 includes a local feature calculation 622 followed by a global feature calculation 624. The global feature calculation 624 may, for example, combine local features and perform additional feature extraction. The global feature space version of current operation is provided from the feature calculation 620 to a model adaptation element 630.

The system 600 also includes an augmented system model 650 in which data output from a system high fidelity model 660 is provided directly to a VAR model 670. The output of the data driven model 670 is then converted into feature space by a feature calculation 680 before being provided to the model adaptation element 630. Note that the feature calculation 680 includes a local feature calculation 682 followed by a global feature calculation 684. The model adaptation element 630 may then compare current operation in the global feature space with the augmented system model 650 output (also in global feature space) and provide parameter adaptations 632 to the data driven model 670.

By way of examples only, the gas turbine 610 might have monitoring nodes might comprise physical and/or virtual monitoring sensors associated with turbine exhaust, ambient temperature, ambient pressure, an inlet pressure drop, a compressor inlet temperature, a generator output, a fuel pressure, shaft speed, a compressor discharge pressure or temperature, an exhaust gas temperature, emissions, etc. The monitoring notes might also be associated with actuators such as, for example, an inlet guide valve command, a bleed heat valve command, fuel or stop valve position, an ambient pressure, an inlet or exhaust pressure delta, a specific humidity or ambient temperature, a fuel flow, or a temperature of fuel.

Thus, the embodiment of FIG. 6 uses a data driven model 670 with time series data (i.e., without transforming to features). Note that the data driven model 670 may be a purely data-driven parameterized dynamic model whose parameters are to be adopted. In contrast, the high fidelity system model 660 may be a hybrid version (i.e., with both system physics and data-driven transfer functions) of the gas turbine 610. The process may begin with training data from the system high fidelity model 660, which is used to construct the data driven model 670. The output of the data drive model 670 may go through feature engineering in feature calculation 680. According to some embodiments, PCA features will be used (although embodiments may be implemented with any type of feature). According to some embodiments, a PCA feature review may be performed. Given temporal data with a certain batch size, PCA in feature calculation 680 may generate weights that describe the data. The first weight will carry the largest amount of information about the monitoring node data, the second will carry less information, etc.

In parallel to this process, data from the actual gas turbine 610 will undergo identical feature engineering in feature calculation 620. With both outputs in feature space, a comparison can be performed by the model adaptation element 630 to examine the difference. The error between the model output and the real gas turbine output can be minimized by having feedback 632 to the data driven model 670. Thus, as the gas turbine 610 changes, the results will propagate into the sensor data, the sensor data undergoes feature engineering 620 and is compared against the augmented system model 650 output which is being filtered through the data driven model 670 in feature space. Deviations between the two can be compensated for by adapting 632 the data driven model 670 parameters. Note that in some embodiments, the augmented system model 650 may also receive information from the gas turbine 610 (e.g., the system high fidelity model 660 might receive information from the gas turbine 210).

If there are 3 (for example) monitoring nodes that are used to characterize the system, the measured output process will be a 3×1 vector, each element in the vector [a(n), b(n), c(n)] is sample time values of the monitoring nodes at time n.

$$y(n) = \begin{bmatrix} a(n) \\ b(n) \\ c(n) \end{bmatrix} \quad (1)$$

The predicted output based on the previously measured data P is given by the following equation:

$$\hat{y}(n) = -\sum_{i=1}^{P} A_i y(n-i) \quad (2)$$

The error between the measured and predicted outputs can then be calculated as follows:

$$e(n) = y(n) - \hat{y}(n) = y(n) + \sum_{i=1}^{P} A_i y(n-i) \quad (3)$$

where $A_i$ for $i=1, \ldots, P$ are 3×3 matrices which define the VAR matrix coefficients. Prediction error is assumed to be zero-mean white noise. The error can be minimized with respect to least squares. The Mean Square Error ("MSE") can then be calculated by:

$$E[e^2(n)] = E[e(n)e^T(n)] = E[y(n) + E_{i=1}^{P} A_i y(n-i)][y^T(n) + \Sigma_{i=1}^{P} y^T(n-i) A_i^T] = R_{yy}(0) \pm \Sigma_{i=1}^{P} A_i R_{yy}^T(i) + \Sigma_{i=1}^{P} R_{yy}(i) A_i^T + \Sigma_{i=1}^{P} A_i R_{yy}(j-i) A_j^T \quad (4)$$

where $R_{yy}(i)$ is the 3×3 correlation matrix of the output system t at lag i. The equation for the correlation matrix:

$$R_{yy}(i) = \begin{bmatrix} r_{aa}(i) & r_{ab}(i) & r_{ac}(i) \\ r_{ba}(i) & r_{bb}(i) & r_{bc}(i) \\ r_{ca}(i) & r_{cb}(i) & r_{cc}(i) \end{bmatrix} \quad (5)$$

Since y(n) is a real value, $R_{yy}(-i)=R_{yy}^T(i)$. The diagonal elements of the matrix Ryy(i) are the autocorrelation of the three components-inputs. The off diagonal elements are a measure of correlation between the three coordinates. The system may now optimize the cost function min $E[e^2(n)]$, given in equation (4) with respect to the matrix $A_i$. The result is:

$$\begin{bmatrix} R_{yy}(0) & R_{yy}(1) & \ldots & R_{yy}(P) \\ R_{yy}(1) & R_{yy}(0) & \ldots & R_{yy}(P-1) \\ \ldots & \ldots & \ldots & \ldots \\ R_{yy}(P) & R_{yy}(P-1) & \ldots & R_{yy}(0) \end{bmatrix} \begin{bmatrix} I \\ A_1 \\ \ldots \\ A_P \end{bmatrix} = \begin{bmatrix} \Sigma \\ 0 \\ \ldots \\ 0 \end{bmatrix} \quad (6)$$

where I is a 3×3 identity matrix, and 0 is a 3×3 matrix of zero elements, and Σ is the 3×3 covariance matrix of the prediction error signal e(n).

Σ is the covariance matrix of the error function which is computed from the error signal. In analytic form, from equation 4, it is:

$$\Sigma = R_{yy}(0) A_0^T + R_{yy}(1) A_1^T + R_{yy}(2) A_2^T + \ldots + R_{yy}(P) A_P^T \quad (7)$$

After estimating the VAR matrix coefficients the system can predict the new values of the parameters from the P previous values of the output using equation (2):

$$\hat{y}(n) = -\Sigma_{i=1}^{P} A_i y(n-i) \quad (8)$$

The input to the data driven model 670 will be the high fidelity model outputs, therefore the predictions from the data driven model 670 can be compared with real measured values from the asset. Three possible methods for adaptation due to deviation in the outputs of the data driven model 670 are:

using a Time Varying Parameter data driven model 670 ("TVP-VAR"),
event based re-training of the data driven model 670, and
batch-by-batch updates on a continuous basis.

In the time varying parameter data driven model 670 approach, the system may take the general form of the data driven model 670 (non-vector example given):

$$Cy_n = -\Sigma_{i=1}^{P} A_i y(n-1) + e_n \quad (9)$$

This form can then be reduced:

$$y_n = -\Sigma_{i=1}^{P} D_i y(n-i) + C^{-1} e_n \quad (10)$$

Thus, the expanded form is:

$$y_n = -(D_1 y(n-1) + \ldots + D_p y(n-p)) + C^{-1} e_n \quad (11)$$

By defining the following terms:

$x_n = I \otimes (y_{t-1}, \ldots, y_{t-p})$, with $\otimes$ being the Kronecker product $\beta = row$ vector containing $D_1 \rightarrow D_p$ The form becomes:

$$y_n = -X_n \beta + C^{-1} e_n \quad (12)$$

At this point all parameters are still time invariant. Thus, to make the model time variant, the parameters $\beta$, C and $\Sigma$ may need to be time varying, as shown below:

$$y_n = -X_n \beta_n + C_n^{-1} e_n \quad (13)$$

There are many ways to model the time-varying parameters. For example, let $C_n$ be a stacked vector of the lower-triangle elements in $C_n$. The parameters in the above equation may then be assumed to follow the random walk process for drift as defined below:

$$\beta_{n+1} = \beta_n + u_{\beta n}, \; C_{n+1} = C_n + u_{cn} \quad (14)$$

$$\begin{pmatrix} e_n \\ u_{\beta n} \\ u_{cn} \end{pmatrix} \sim N \begin{pmatrix} 0, \begin{pmatrix} I & 0 & 0 \\ 0 & \Sigma_\beta & 0 \\ 0 & 0 & \Sigma_c \end{pmatrix} \end{pmatrix}$$

In the event based retraining of the data driven model 670 described in equation (8), the model may be retrained when the error, $E_n$, between the augmented model outputs and an asset's outputs is larger than some predetermined threshold:

$$E_n^T E_n > THR \quad (15)$$

Note that equation (13) states when the error is greater than THR, a predefined tuning parameter for the threshold, the data driven model will be retrained.

The batch-by-batch approach may be very similar to event-based training, but with a caveat that model parameters are updated at the end of every batch. The system may use a time-invariant data driven model 670 of the form described in equation (8). Note that batch length may be fixed based on specific asset class.

Figure 7:
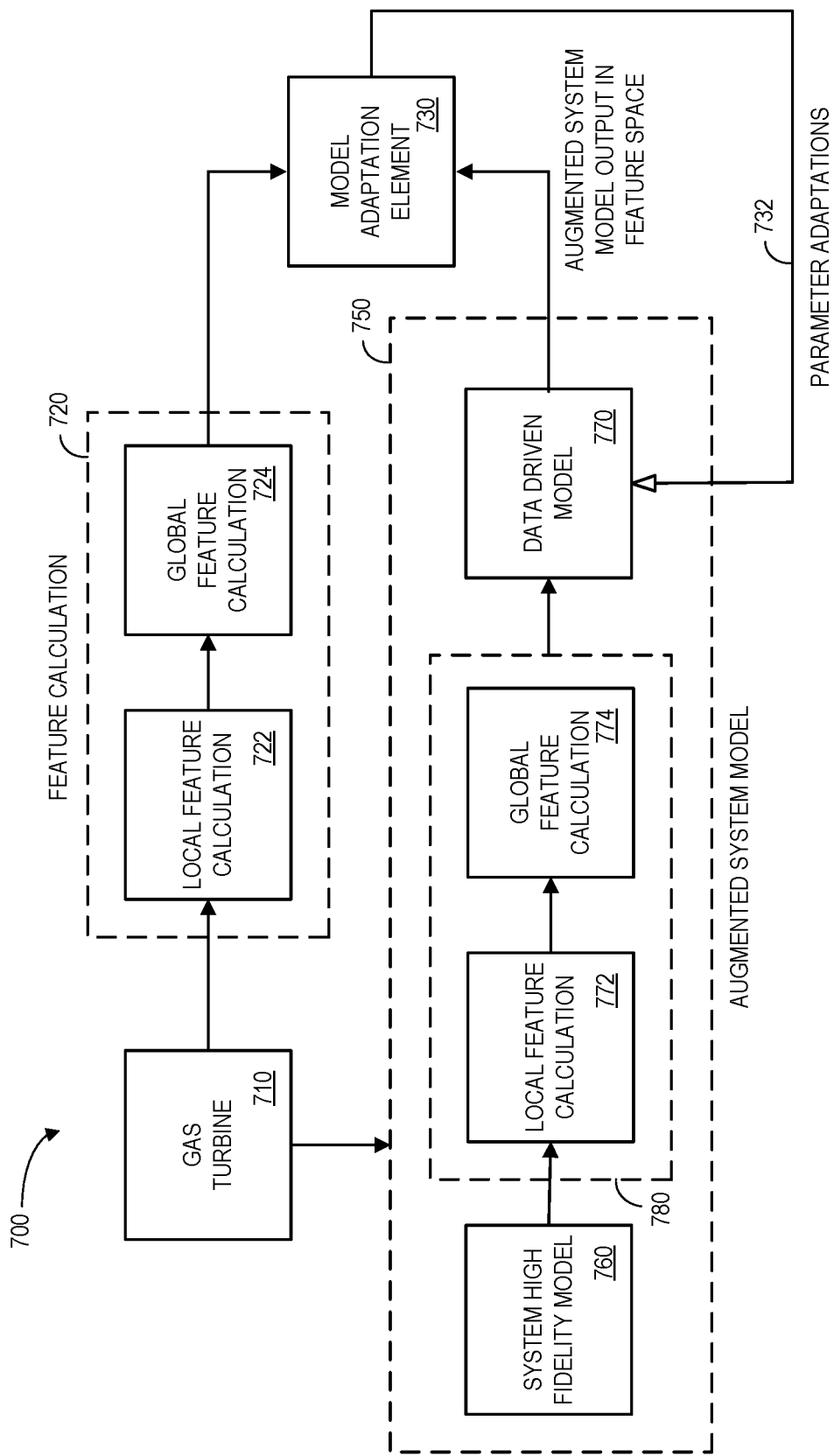
FIG. 7 is a block diagram of a gas turbine system with local and global feature calculations located before a data driven model according to some embodiments.

Note that the above implementation operates the data driven model 670 in sensor space. That is, the data driven model 670 is constructed with parameters that utilize time series data. Alternate implementations may involve the use of a data driven model in feature space. Such an implementation may fewer parameters in the data driven model in feature space. For example, FIG. 7 is a block diagram of a gas turbine 710 system 700 with local and global feature calculations located before a data driven model 770 according to some embodiments. As before, the system 700 includes the gas turbine 710 and a feature calculation 720 that converts time series information about the current operation of the gas turbine 710 into feature space. The feature calculation 720 includes a local feature calculation 722 followed by a global feature calculation 724. The feature space version of current operation is provided from the feature calculation 720 to a model adaptation element 730. Note that in some embodiments, the augmented system model 750 may also receive information from the industrial asset 710 (e.g., the system high fidelity model 760 might receive information from the industrial asset 710).

The system 700 also includes an augmented system model 750 in which data output from a system high fidelity model 760 is transformed into feature space by the feature calculation 780. The feature calculation 780 includes a local feature calculation 782 followed by a global feature calculation 784. This feature space information is then provided to the data driven model 770. The output of the data driven model 770 will then already be in feature space when it is provided to the model adaptation element 730. The model adaptation element 730 may then compare current operation in the feature space with the augmented system model 750 output (also in feature space) and provide parameter adaptations 732 to the data driven model 770. Note that in some embodiments, the augmented system model 750 may also receive information from the gas turbine 610 (e.g., the system high fidelity model 660 might receive information from the gas turbine 610).

Figure 8:
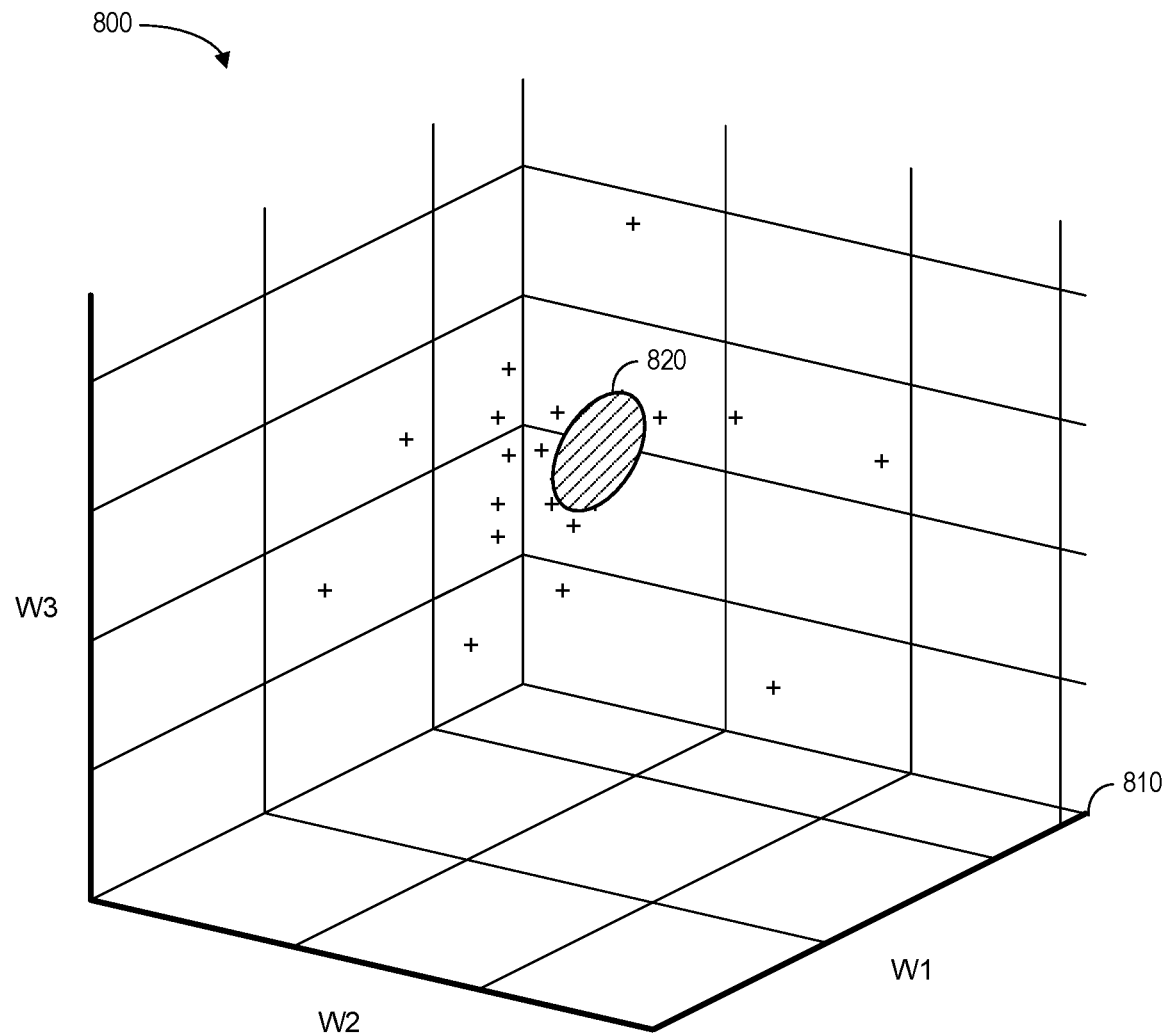
FIG. 8 illustrates three dimensions of monitoring node outputs in accordance with some embodiments.

FIG. 8 illustrates 800 three dimensions of monitoring node outputs in accordance with some embodiments. In particular, a graph 810 plots monitoring node outputs ("+") in three dimensions, such as dimensions associated with Principal Component Features ("PCF"): w1, w2, and w3. Moreover, the graph 810 includes an indication of a normal operating space 820. Although a single contiguous area 820 is illustrated in FIG. 8, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{orginal}(k)}{\overline{S}_{nominal}}$$

where S stands for a monitoring node quantity at "k" instant of time, and $\overline{S}_{nominal}$ is the mean value of the nominal S over a window on which the features are calculated. Moreover, output may then be expressed as a weighted linear combination of basis functions as follows:

$$S = S_0 + \sum_{j=1}^{N} w_i \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Figure 9:
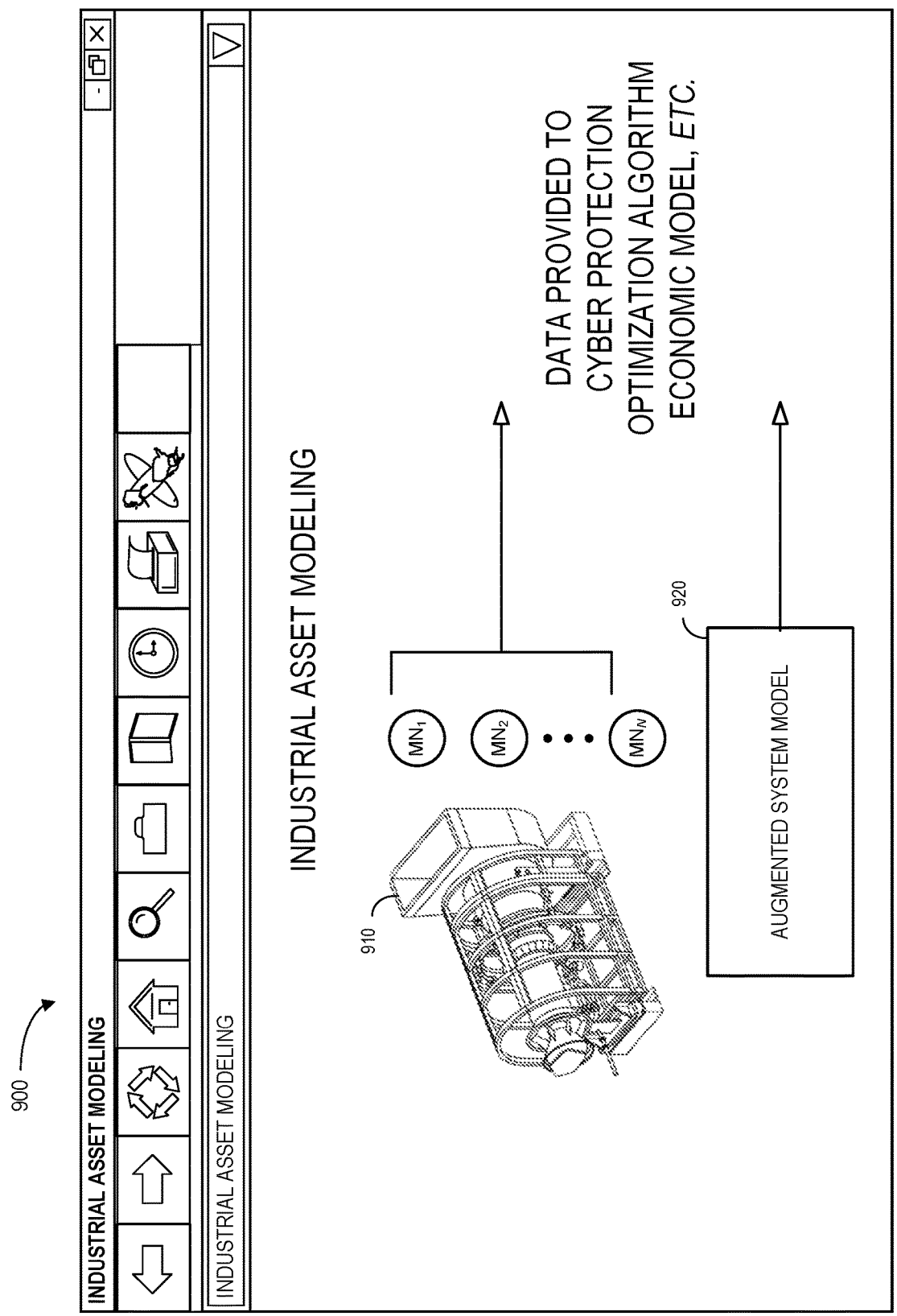
FIG. 9 is an industrial asset modeling display according to some embodiments.

FIG. 9 is an industrial asset control system modeling display 900 according to some embodiments. The display 900 includes information about an industrial asset 910 having monitoring nodes. The display 900 further includes information about an augmented system model 920 in accordance with any of the embodiments described herein. Selection of an element on the display 900 (e.g., via a computer mouse pointer or touchscreen) might, for example, provide further information about that element (e.g., via a detailed pop-up window), allow for alteration of information about that element, etc.

Figure 10:
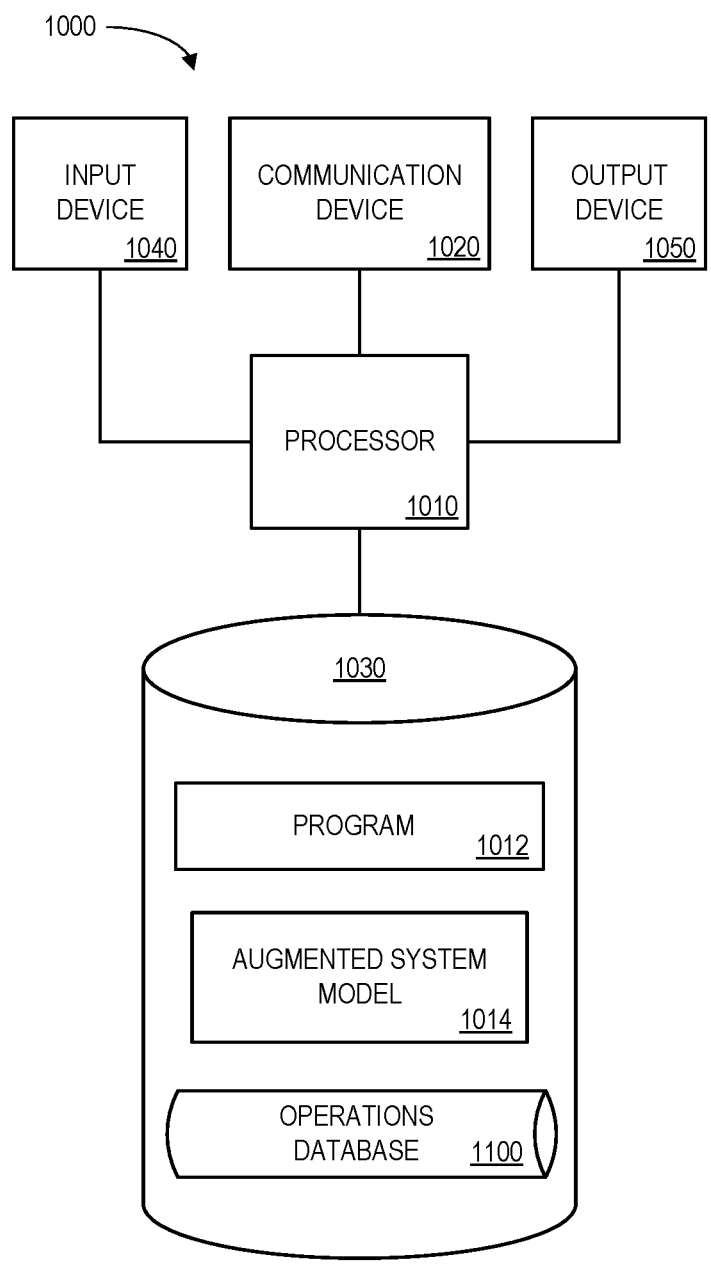
FIG. 10 is a block diagram of an industrial asset modeling platform according to some embodiments of the present invention.

The embodiments described herein may be implemented using any number of different hardware configurations. For example, FIG. 10 is a block diagram of an industrial asset modeling platform 1000 that may be, for example, associated with the system 100 of FIG. 1 (or any other embodiment described herein). The industrial asset modeling platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote monitoring nodes, operator terminals, external algorithms, etc. The industrial asset modeling platform 1000 further includes an input device 1040 (e.g., a computer mouse and/or keyboard to input industrial asset configuration information) and/or output device 1050 (e.g., a computer monitor to render a display, provide alerts, transmit recommendations, and/or create reports). According to some embodiments, a mobile device, monitoring physical system, and/or PC may be used to exchange information with the industrial asset modeling platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or an augmented system model 1014 for controlling the processor 1010. The processor 1010 performs instructions of the programs 1012, 1014, and thereby operates in accordance with any of the embodiments described herein. For example, the processor 1010 may model an industrial asset with an augmented system model with a system high fidelity model of the industrial asset to generate a first output. The augmented system model may further include a data driven model to receive data associated with the first output and to generate a second output, wherein a feature space version of the second output is output from the augmented system model. A plurality of monitoring nodes may each generate a series of current monitoring node values over time that represent a current operation of the industrial asset. The processor 1010 may receive the series of current monitoring node values over time and calculate a feature space version of current operation of the industrial asset. The processor 1010 may then compare the feature space version of the second output of the augmented system model with the feature space version of current operation of the industrial asset. Parameters of the data driven model may then be adapted by the processor 1010 based on a result of the comparison.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the industrial asset modeling platform 1000 from another device; or (ii) a software application or module within the industrial asset modeling platform 1000 from another software application, module, or any other source.

In some embodiments (such as the one shown in FIG. 10), the storage device 1030 further stores an operations database 1100. An example of a database that may be used in connection with the industrial asset modeling platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
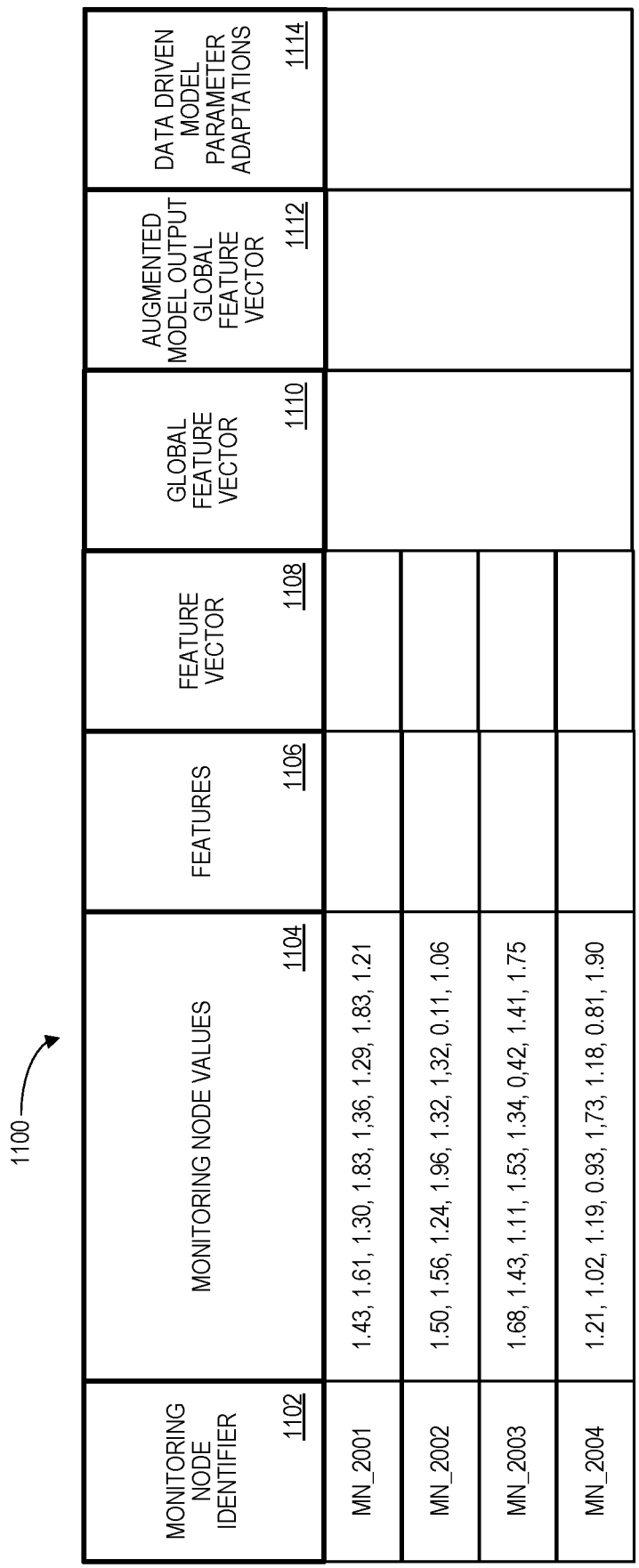
FIG. 11 is a tabular portion of an operations database.

Referring to FIG. 11, a table is shown that represents the operations database 1100 that may be stored at the industrial asset modeling platform 1000 according to some embodiments. The table may include, for example, entries identifying monitoring nodes associated with a physical system. The table may also define fields 1102, 1104, 1106, 1108, 1110, 1112, 1114 for each of the entries. The fields 1102, 1104, 1106, 1108, 1110, 1112, 1114 may, according to some embodiments, specify: a monitoring node identifier 1102, monitoring node values 1104, features 1106, feature vectors 1108, a global feature vector 1110, an augmented model output global feature vector 1112, and data driven model parameter adaptations. The operations database 1100 may be created and updated, for example, as an industrial asset is running in substantially real-time.

The monitoring node identifier 1102 may be, for example, a unique alphanumeric code identifying a monitoring node in an industrial asset that detects the series of monitoring node values 1104 over time (e.g., in batches of 30 to 50 seconds of data). The monitoring node values 1104 may be used to create the features 1106 and feature vectors 1108. The feature vectors 1110 associated with multiple monitoring node identifiers 1102 may then be used to create an overall global feature vector 1110 (representing current operations for the entire industrial asset). The augmented model output global feature vector 1112 might be created in accordance with any of the embodiments described herein and then be compared to the global feature vector 1110. As a result of this comparison, the driven model parameter adaptations may be calculated and used to update, for example, a data driven model such as a VAR model.

Thus, embodiments may model an industrial asset in an automatic and accurate manner. Moreover, the framework may allow for the development of tools that facilitate proliferation of the invention to various systems (i.e., gas turbines, steam turbines, wind turbines, aviation engines, locomotive engines, power grid, etc.) in multiple geolocations. According to some embodiments, distributed modeling systems enabled by this technology (across multiple types of equipment and systems) may allow for the collection of coordinated data to help improve models. Note that the feature-based approaches described herein may allow for extended feature vectors and/or incorporate new features into existing vectors as new learnings and alternate sources of data become available.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as dams, the power grid, military devices, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to model an industrial asset, comprising:
an augmented system model, including:
a system fidelity model of the industrial asset to generate a first output, and
a data driven model to receive the first output and to generate a second output based on the first output,
wherein a feature space version of the second output is calculated via execution of a global feature calculation, wherein the global feature calculation comprises calculating a local feature vector for each of multiple given components of the industrial asset, and combining the multiple local feature vectors into a global feature vector, and the feature space version of the second output is output from the augmented system model, wherein the feature space version of the second output is an n-dimensional representation of the second output, and "n" is the number of measurable features in the second output;
a plurality of monitoring nodes each generating a series of current monitoring node values over time that represent a current operation of the industrial asset, wherein the industrial asset is a physical machine and the plurality of monitoring nodes are sensors connected to the industrial asset; and
a model adaptation element to:
receive the series of current monitoring node values over time and calculate a feature space version of current operation of the industrial asset,
compare the feature space version of the second output of the augmented system model with the feature space version of current operation of the industrial asset, and
adapt parameters of the data driven model based on a result of said comparison.

2. The system of claim 1, wherein the first output is provided directly to the data driven model, and the second output is used to calculate the feature space version of the second output.

3. The system of claim 1, wherein the first output is used to calculate a feature space version of the first output provided to the data driven model as an input such that the second output generated by the data driven model is already in feature space.

4. The system of claim 1, wherein the calculation of the feature space version of current operation of industrial asset comprises calculating a local feature vector for each of the multiple given elements of the system and combining the calculated local feature vectors to calculate global features of current operation of the industrial asset.

5. The system of claim 4, wherein feature calculations comprise at least one of: (i) unsupervised learning, (ii) k-means clustering, (iii) manifold learning, (iv) non-linear embedding, (v) an isomap method, (vi) Locally-Linear Embedding ("LLE"), (vii) low-dimension projection, (viii) Principal Component Analysis ("PCA"), (ix) Independent Component Analysis ("ICA"), (x) neural networks, (xi) a Self-Organizing Map ("SOM") method, (xii) genetic programing, (xiii) sparse coding, (xiv) linear discriminant analysis, (xv) wavelet transform, and (xvi) Fourier transform.

6. The system of claim 1, wherein the data driven model is a Vector Auto-Regressive ("VAR") model.

7. The system of claim 6, wherein said comparing and adapting performed by the model adaptation unit use a time varying parameter VAR model.

8. The system of claim 6, wherein said comparing and adapting performed by the model adaptation unit use an event based re-training of the VAR model.

9. The system of claim 6, wherein said comparing and adapting performed by the model adaptation unit use batch-by-batch updates of the VAR model on a continuous basis.

10. The system of claim 1, wherein the data driven model is associated with at least one of: (i) a linear data driven model, (ii) a non-linear data driven model, (iii) neural network, (iv) a fuzzy rule-based system, (v) a genetic algorithm, (vi) a clustered Vector Auto-Regressive ("VAR") model, (vii) a Single Input, Single Output ("SISO") transfer function, and (viii) a Multiple Input, Multiple Output ("MIMO") transfer function.

11. A method to model an industrial asset, comprising:
outputting, by an augmented system model that includes a system fidelity model of the industrial asset in series with a data driven model, a feature space version of augmented system model output calculated via execution of a global feature calculation, wherein the global feature calculation comprises calculating a local feature vector for each of multiple given components of the industrial asset, and combining the multiple local feature vectors into a global feature vector, wherein the feature space version of the augmented system model output is an n-dimensional representation of the augmented system model output and "n" is the number of measurable features in the augmented system model output;
receiving, at a model adaptation element from a plurality of monitoring nodes, a series of current monitoring node values over time that represent a current operation of the industrial asset, wherein the industrial asset is a physical machine and the plurality of monitoring nodes are sensors connected to the industrial asset;

calculating a feature space version of current operation of the industrial asset;

comparing, by the model adaptation element, the feature space version of the augmented system model output with the feature space version of current operation of the industrial asset; and adapting parameters of the data driven model based on a result of said comparison.

12. The method of claim 11, wherein the calculation of the feature space version of current operation of industrial asset comprises calculating a local feature vector for each of multiple given elements of the system and combining the calculated local feature vectors to calculate global features of current operation of the industrial asset.

13. The method of claim 12, wherein feature calculations comprise at least one of: (i) unsupervised learning, (ii) k-means clustering, (iii) manifold learning, (iv) non-linear embedding, (v) an isomap method, (vi) Locally-Linear Embedding ("LLE"), (vii) low-dimension projection, (viii) Principal Component Analysis ("PCA"), (ix) Independent Component Analysis ("ICA"), (x) neural networks, (xi) a Self-Organizing Map ("SOM") method, (xii) genetic programing, (xiii) sparse coding, (xiv) linear discriminant analysis, (xv) wavelet transform, and (xvi) Fourier transform.

14. The method of claim 11, wherein the data driven model is a Vector Auto-Regressive ("VAR") model.

15. The method of claim 14, wherein said comparing and adapting performed by the model adaptation unit use a time varying parameter VAR model.

16. The system of claim 14, wherein said comparing and adapting performed by the model adaptation unit use an event based re-training of the VAR model.

17. The system of claim 14, wherein said comparing and adapting performed by the model adaptation unit use batch-by-batch updates of the VAR model on a continuous basis.

18. A non-transitory, computer-readable medium storing instructions that, when executed by a computer processor, cause the computer processor to perform a method to model an industrial asset, the method comprising:

outputting, by an augmented system model that includes a system fidelity model of the industrial asset in series with a data driven model, a feature space version of augmented system model output calculated via execution of a global feature calculation, wherein the global feature calculation comprises calculating a local feature vector for each of multiple given components of the industrial asset, and combining the multiple local feature vectors into a global feature vector, wherein the feature space version of the augmented system model output is an n-dimensional representation of the augmented system model output and "n" is the number of measurable features in the augmented system model output;

receiving, at a model adaptation element from a plurality of monitoring nodes, a series of current monitoring node values over time that represent a current operation of the industrial asset, wherein the industrial asset is a physical machine and the plurality of monitoring nodes are sensors connected to the industrial asset;

calculating a feature space version of current operation of the industrial asset;

comparing, by the model adaptation element, the feature space version of augmented system model output with the feature space version of current operation of the industrial asset; and adapting parameters of the linear driven model based on a result of said comparison.

19. The medium of claim 18, wherein the calculation of the feature space version of current operation of industrial asset comprises calculating a local feature vector for each of multiple given elements of the system and combining the calculated local feature vectors to calculate global features of current operation of the industrial asset.

20. The method of claim 19, wherein the data driven model is a Vector Auto-Regressive ("VAR") model.

* * * * *